(12) United States Patent
Kim et al.

(10) Patent No.: US 8,698,972 B2
(45) Date of Patent: Apr. 15, 2014

(54) LIQUID CRYSTAL DISPLAY DEVICE

(75) Inventors: Tae Bae Kim, Asan-si (KR); Dong Hwan Kim, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 99 days.

(21) Appl. No.: 13/116,299

(22) Filed: May 26, 2011

(65) Prior Publication Data

US 2012/0050634 A1    Mar. 1, 2012

(30) Foreign Application Priority Data

Aug. 25, 2010 (KR) .................. 10-2010-0082325

(51) Int. Cl.
  *G02F 1/1333* (2006.01)
  *G02F 1/1335* (2006.01)
(52) U.S. Cl.
  CPC ............ *G02F 1/1333* (2013.01); *G02F 1/1335* (2013.01)
  USPC .............................................. 349/58; 349/65
(58) Field of Classification Search
  CPC ................................ G02F 1/1333; G02F 1/1335
  USPC ........................................................ 349/58, 65
  See application file for complete search history.

(56) References Cited

U.S. PATENT DOCUMENTS

| | | | |
|---|---|---|---|
| 6,392,724 B2 * | 5/2002 | An et al. .......................... | 349/58 |
| 2006/0092346 A1 * | 5/2006 | Moon et al. ..................... | 349/61 |
| 2008/0074580 A1 * | 3/2008 | Chang ............................. | 349/65 |
| 2008/0180600 A1 * | 7/2008 | Oh ................................... | 349/65 |
| 2009/0086122 A1 * | 4/2009 | Tsubokura ....................... | 349/58 |

FOREIGN PATENT DOCUMENTS

JP    2004-233764 A    8/2004

* cited by examiner

*Primary Examiner* — Lucy Chien
(74) *Attorney, Agent, or Firm* — Sughrue Mion, PLLC

(57) ABSTRACT

A liquid crystal display device is provided. The liquid crystal display device includes a side frame provided with a reflective surface to refract light irradiated from light-emitting diodes arranged to direct light upward at a predetermined position. The side frame constitutes the side periphery of the liquid crystal display device and is connected with a bottom chassis through a holder. The configuration of the side frame and reflective surface is able to reduce a width of a bezel portion of a top chassis and prevent light from bypassing a light guide portion so as to prevent bright lines from forming on a display.

32 Claims, 3 Drawing Sheets

LIQUID CRYSTAL DISPLAY DEVICE

CROSS-REFERENCE TO RELATED APPLICATION(S)

This application claims priority from Korean Patent Application No. 2010-0082325, filed on Aug. 25, 2010 in the Korean Intellectual Property Office, the disclosure of which is incorporated herein by reference in its entirety.

BACKGROUND

1. Field

Apparatuses consistent with embodiments relate generally to a liquid crystal display device having a bezel portion with a narrow width.

2. Description of the Related Art

A liquid crystal display (LCD) device displays an image using electrical and optical properties of liquid crystal. The liquid crystal display (LCD) device has advantages of small thickness, light-weight, low power consumption and low driving voltage and is thus widely utilized in the overall industry.

The liquid crystal display includes a liquid crystal display panel in which the orientation of liquid crystal molecules and thus light transmittance are changed by applying an electric voltage to liquid crystals sealed between two transparent substrates. The liquid crystal display then optically displays an image, and a backlight assembly is provided to provide light to the liquid crystal panel.

Recently, an edge-type backlight assembly using a light-emitting diode (LED) as a light source has been generally used to realize slimness of the liquid crystal display device.

The edge-type backlight assembly operates in a manner such that a light-emitting diode is mounted at a side surface of a backlight assembly, and light is directed to a front surface of the liquid crystal display through a light-guide portion, thus realizing slimness due to a decrease in overall thickness of the backlight assembly.

Such a liquid crystal display seeks the slimness and light-weight trends to secure competitiveness. In particular, technologies to reduce the width extending from the peripheral line of a display panel to an active area in which a screen is actually displayed (hereinafter, referred to as a "bezel width") and thereby decrease the peripheral size of image display devices are being developed.

This decrease in bezel width is advantageous in that concentration on the screen is improved and the screen appears larger.

However, the structure having the edge-type backlight assembly has a minimum optical distance necessary for light to be emitted from the light-emitting diode to the light-guide portion.

Accordingly, a minimal bezel width is required to cover these elements. For this reason, there is a limitation in reducing the bezel width to a predetermined distance or less.

SUMMARY

One or more exemplary embodiments provide a liquid crystal display device to prevent bright lines.

One or more exemplary embodiments also provide a liquid crystal display device including a liquid crystal display panel; a top chassis disposed behind a front surface of the liquid crystal display panel; a bottom chassis arranged on a rear surface of the liquid crystal display panel; at least one optical sheet arranged between the liquid crystal display panel and the bottom chassis; a light-guide portion arranged between the bottom chassis and the optical sheet; a reflective portion arranged between the light-guide portion and the bottom chassis; a side frame provided with a side wall to surround an outside of the light-guide portion, an outside of the reflective portion and an outside of the bottom chassis, with the side frame having a support rib extending from the side wall to safely mount the liquid crystal display panel and the optical sheet; a printed circuit board arranged between the side frame and the bottom chassis, the printed circuit board provided with a plurality of light-emitting diodes; a reflective surface provided on an inner surface of the side frame to direct light irradiated from the light-emitting diodes to a side of the light-guide portion; and a holder to support one surface of the printed circuit board and connect the side frame with the bottom chassis.

The holder may be made of a thermally conductive material.

The side frame may be made of a metal material.

The reflective surface may have a predetermined curvature.

The side frame may be made of a resin material.

One side of the printed circuit board may be mounted in a mounting groove formed on an inner surface of the printed circuit board.

The top chassis may be provided with a bezel portion to support an edge of the liquid crystal display panel, and wherein the top chassis is provided with a side portion extending from an end of the bezel portion, wherein the side wall of the side frame is provided with a recessed surface to enable the side portion to be mounted therein.

The support rib may be provided with a mounting surface at a top side thereof to enable the liquid crystal display panel and optical sheet to be mounted, and wherein the support rib is provided with a supporting surface at a bottom side thereof to support a top of the light-guide portion.

The supporting surface may include a first supporting surface closely contacting the top of the light-guide portion and a second supporting surface extending from the first supporting surface and thus not closely contacting the top of the light-guide portion in order to compensate for a length of the light-guide portion that varies by thermal deformation.

The reflective surface may be inclined downward from an end of the second supporting surface.

The light-guide portion may include a light-emitting surface facing the liquid crystal display panel and an incident surface at the side of the light-guide portion, such that the incident surface is perpendicular to the light-emitting surface, wherein the reflective surface is spaced away from the incident surface and faces the incident surface.

The light-emitting diodes may be mounted on the printed circuit board such that the light emitting diodes emit light through a light emitting surface in an upward direction, and wherein the light-emitting surface positioned below lower than the reflective portion.

The bottom chassis may be made of a thermally conductive material and emits heat generated by the printed circuit board.

In another exemplary embodiment, a liquid crystal display device includes: a liquid crystal display panel; a light-guide portion including a light-emitting surface facing the liquid crystal display panel, wherein the light-guide portion supplies light to the liquid crystal display panel and supplies light to an incident surface of the light-guide portion that is perpendicular to the light-emitting surface; and a printed circuit board disposed at a side of the light-guide portion, the printed circuit board provided with a plurality of light-emitting diodes; a side frame provided with a side wall to constitute a side periphery of the liquid crystal display device and a support rib extending from the side wall to enable the liquid crystal display panel to be mounted therein, wherein a reflective surface is provided at an inner surface of the side frame facing the incident surface to refract light emitted upward from the light-emitting surface toward the incident surface.

The support rib may be provided with a mounting surface at a top side thereof to enable to be mounted thereon, and wherein the support rib is provided with a supporting surface at a bottom side thereof which is parallel to the light-emitting surface of the light-guide portion, to enable the support rib and the light-emitting surface of the light-guide portion to closely contact each other.

The supporting surface may include a first supporting surface closely contacting the light-emitting surface and a second supporting surface to compensate for a length of the light-guide portion that varies by thermal deformation.

The liquid crystal display device may further include: a reflective portion arranged under the light-guide portion; and a bottom chassis arranged under the reflective portion, wherein the plurality of light-emitting diodes are arranged between the inner surface of the side frame and a side of the bottom chassis.

The inner surface of the side frame may be provided with a mounting groove to enable one side of the printed circuit board to be mounted therein, and the bottom chassis may be provided with an accepting groove at an edge thereof to accept another side of the printed circuit board.

The liquid crystal display device may further include a holder closely contacting a bottom surface of the printed circuit board and connecting the side frame with the bottom chassis.

The holder may be made of a thermally conductive metal material.

The liquid crystal display device may further include: a top chassis provided with a bezel portion to support an edge of the liquid crystal display panel, and wherein the top chassis is provided with a side portion connected with the side wall of the side frame, wherein the side wall of the side frame is provided with a recessed surface to enable the side portion to be mounted thereon.

An outer surface of the side portion mounted on the recessed surface may be flush with an outer surface of the side wall.

The side frame may be made of a steel or aluminum material, and the reflective surface may be integrated with the side frame.

The side frame may be made of a resin material, and the reflective surface may be coated with a metal sheet with a high reflectance.

The light-emitting diodes may be mounted on the printed circuit board such that the light emitting diodes emit light through a light emitting surface in an upward direction, wherein the light-emitting surface is positioned below the light-guide portion.

In another exemplary embodiment, a liquid crystal display device includes a liquid crystal display panel; a light guide portion disposed below the liquid crystal display panel and reflecting light to the liquid crystal display panel; a printed circuit board disposed below the light guide portion and provided with a plurality of light-emitting diodes on a periphery thereof; a side frame surrounding side surfaces of the liquid crystal display panel, the light guide portion and the printed circuit board, the side frame including an angled inner surface reflecting light from the plurality of light-emitting diodes to the side surfaces of the light guide portion; a top chassis connected with the side frame and supporting the liquid crystal display panel; and a bottom chassis connected with the side frame and supporting the printer circuit board.

The angled inner surface of the side frame may be a curved surface.

The angled inner surface may be coated with a reflective material.

As is apparent from the aforementioned description, the liquid crystal display device of the exemplary embodiments described herein reduce the bezel width, and at the same time prevent formation of bright lines, thus improving aesthetic effects and reliability.

BRIEF DESCRIPTION OF THE DRAWINGS

These and/or other aspects of the exemplary embodiments will become more apparent and more readily appreciated from the following description of the exemplary embodiments, taken in conjunction with the accompanying drawings of which.

DETAILED DESCRIPTION

Figure 1:
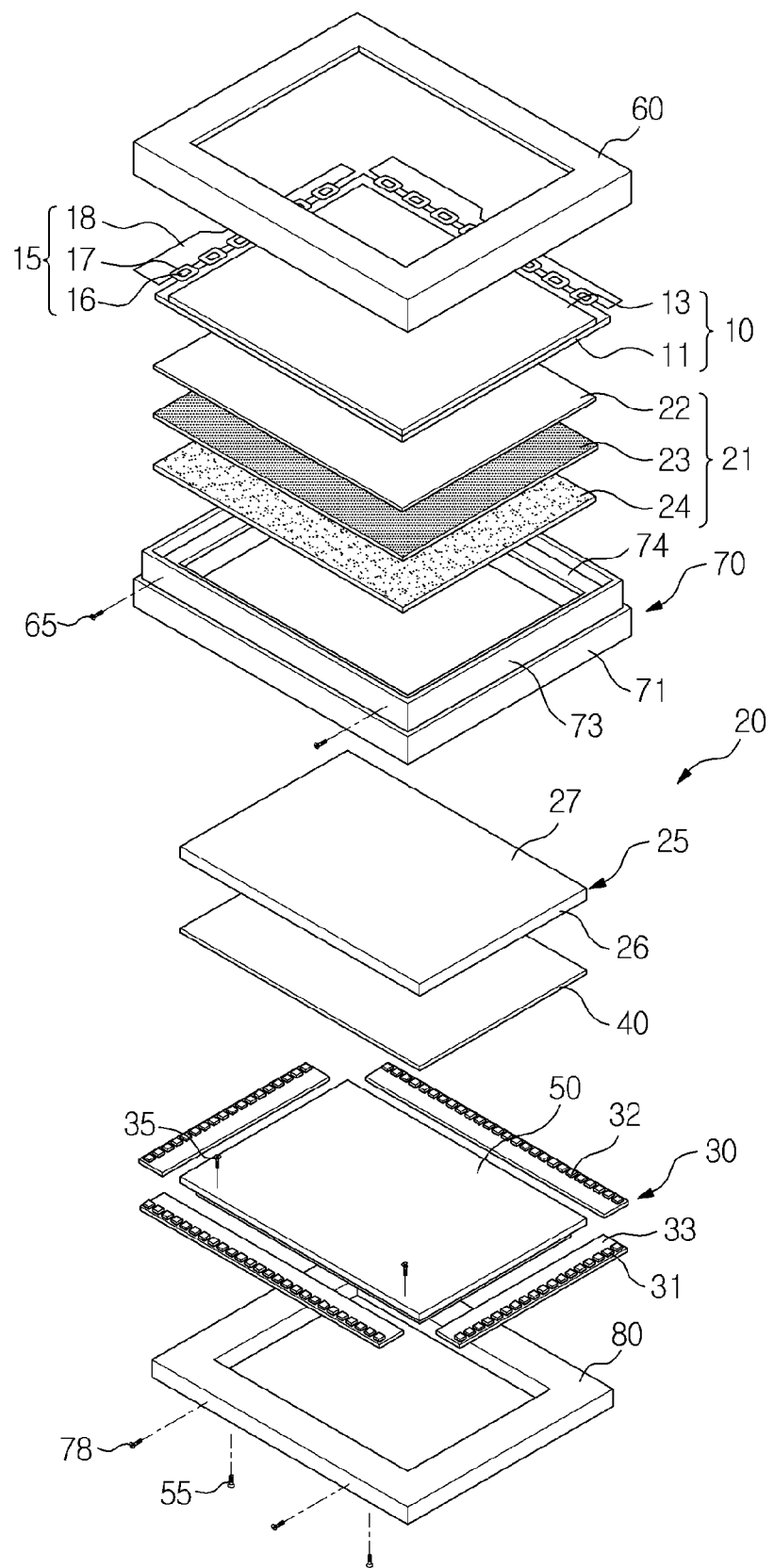
FIG. 1 is an exploded perspective view illustrating a liquid crystal display device, according to one exemplary embodiment.

Reference will now be made in detail to the exemplary embodiments, examples of which are illustrated in the accompanying drawings, wherein like reference numerals refer to the like elements throughout.

FIG. 1 is a perspective view illustrating a schematic structure of a liquid crystal display device, according to one exemplary embodiment.

Referring to FIG. 1, the liquid crystal display device includes: a liquid crystal display panel 10; a backlight unit 20 arranged at the back of the liquid crystal display panel 10; a side frame 70 to support the liquid crystal display panel 10 and the backlight unit 20 such that the liquid crystal display panel 10 is spaced away from the backlight unit 20; and a top chassis 60 and a bottom chassis 50 arranged on the liquid crystal display panel 10 and under the backlight unit 20, respectively.

The liquid crystal display panel 10 further includes: a thin film transistor substrate 11 provided with a thin film transistor; a color filter substrate 13 facing the thin film transistor substrate 11; and a liquid crystal layer (not shown) arranged between the thin film transistor substrate 11 and the color filter substrate 13.

The thin film transistor substrate 11 is provided with a driving portion 15 at one side thereof to apply a driving signal.

The driving portion 15 includes a flexible printed circuit board (FPCB) 16, a driving chip 17 mounted on the flexible printed circuit board 16, and a circuit substrate 18 connected with an opposite side of the flexible printed circuit board 16.

The driving portion 15 may be a chip on film (COF). Alternatively, the driving portion 15 may be any known type such as a tape carrier package (TCP) or a chip on glass (COG). In addition, the driving portion 15 may be mounted on the thin film transistor substrate 11.

Such a liquid crystal display panel 10 controls orientation of liquid crystal layers to form a screen, but receives light from the backlight unit 20 arranged on the back of the panel, since it is non-light-emitting device.

The backlight unit 20 includes: a plurality of optical sheets 21 arranged under the liquid crystal display panel 10; a light-guide portion 25 arranged under the optical sheets 21; a light source unit 30 to supply light to the light-guide portion 25; and a reflective portion 40 arranged under the light-guide portion 25.

Each optical sheet 21 includes a protective film 22, a prism film 23 and a diffusion film 24.

A bead-shaped coating layer is formed on a base substrate of the diffusion film 24 to diffuse light from the light-guide portion 25 and supply the light to the liquid crystal display panel 10.

The prism film 23 includes a plurality of prisms arranged in a predetermined pattern to collect light perpendicularly diffused from the diffusion film 24 and focus the light to the surface of the liquid crystal display panel 10.

The prism film 23 is generally used in two sheets, and micro-prisms formed on each prism film 23 form a predetermined angle.

Most light passing through the prism film 23 proceeds vertically and provides uniform brightness distribution.

The protective film 22 is arranged on the prism film 23 to protect the prism film 23, as the prism film 23 is sensitive to scratches from foreign materials such as dust.

The light-guide portion 25 is made of an acryl-based resin such as polymethylmethacrylate (PMMA) or polymethylstyrene (copolymer of methylmethacrylate and styrene) and uniformly supplies light from the light source unit 30 to the diffusion film 24.

The light-guide portion 25 includes an incident surface 26, on which light is incident from the light source unit 30. The incident surface 26 is provided at the side of the light-guide portion 25. A light-emitting surface 27 faces the diffusion film 24, and a reflective surface (not shown) is arranged parallel to the light-emitting surface 27.

The light source unit 30 includes a plurality of light-emitting diodes (LEDs) 31 to emit light, and a printed circuit board 33 provided with the light-emitting diodes 31 to apply an electrical signal to the light-emitting diodes 31.

The light-emitting diodes 31 may be provided as a plurality of white light-emitting diodes to emit white light, or in a combination of color light-emitting diodes to emit red, green and blue light.

The printed circuit board 33 may be a metal printed circuit board composed of a material such as silicon steel sheet, zinc steel sheet or aluminum sheet having high thermal conductivity, or a flexible printed circuit board (FPCB).

The printed circuit board 33 supplies a driving signal to the light-emitting diodes 31 and transfers heat generated from the light-emitting diodes 31 to the outside.

The light-emitting diodes 31 are mounted on such a printed circuit board 33 and arranged in a lateral lower part of the incident surface 26 of the light-guide portion 25. A light-emitting surface 32 to emit light may be arranged such that it irradiates light upward toward the front of the display device.

Meanwhile, in this exemplary embodiment, the light source unit 30 is provided under each of four sides of the light-guide portion 25 (i.e., a total number of light source units is 4). The light source unit 30 may be provided under opposite sides of the light-guide portion 25 (i.e., a total number of light source units is 2) or under one side of the light-guide portion 25 (i.e., a total number of light source units is 1).

The reflective portion 40 is arranged under the light-guide portion 25, to re-reflect light directed downward and supply the re-reflected light to the light-guide portion 25.

The reflective portion 40 may be made of a plastic material such as polyethylene terephthalate (PET) or polycarbonate (PC).

The bottom chassis 50 is provided as a tetragonal plate with a predetermined thickness and is arranged under the reflective portion 40. Such a bottom chassis 50 may be made of a thermally conductive metal material. The use of a thermally conductive metal material aims to emit heat generated from the light source unit 30 to the outside.

Although not shown in the drawings, the bottom chassis 50 may be provided at the rear surface with a screw hole for screw joining a stud or the like, and with at least one circuit board to drive the liquid crystal display device, according to one exemplary embodiment. That is, when the liquid crystal display device according to one exemplary embodiment is applied to a broadcasting signal receiver (television), a power circuit board and a main circuit board on which required signal processing connectors and signal processing IC are mounted may be joined thereto by a screw. In addition, the driving portion 15 of the liquid crystal display panel may be fixed at the edge of the rear surface of the bottom chassis 50.

The side frame 70 may include a side wall 71 to surround an outside (or outer surface) of the light-guide portion 25, the backlight unit 20 and the bottom chassis 50. A support rib 74 extends from the side wall 71 to provide a space between the optical sheet 21 and the light-guide portion 25.

The side wall 71 constitutes the side periphery of the liquid crystal display device. The liquid crystal display panel 10 and the optical sheet 21 are mounted on the support rib 74, and the bottom of the support rib 74 may be supported by the top of the light-guide portion 25.

Figure 2:
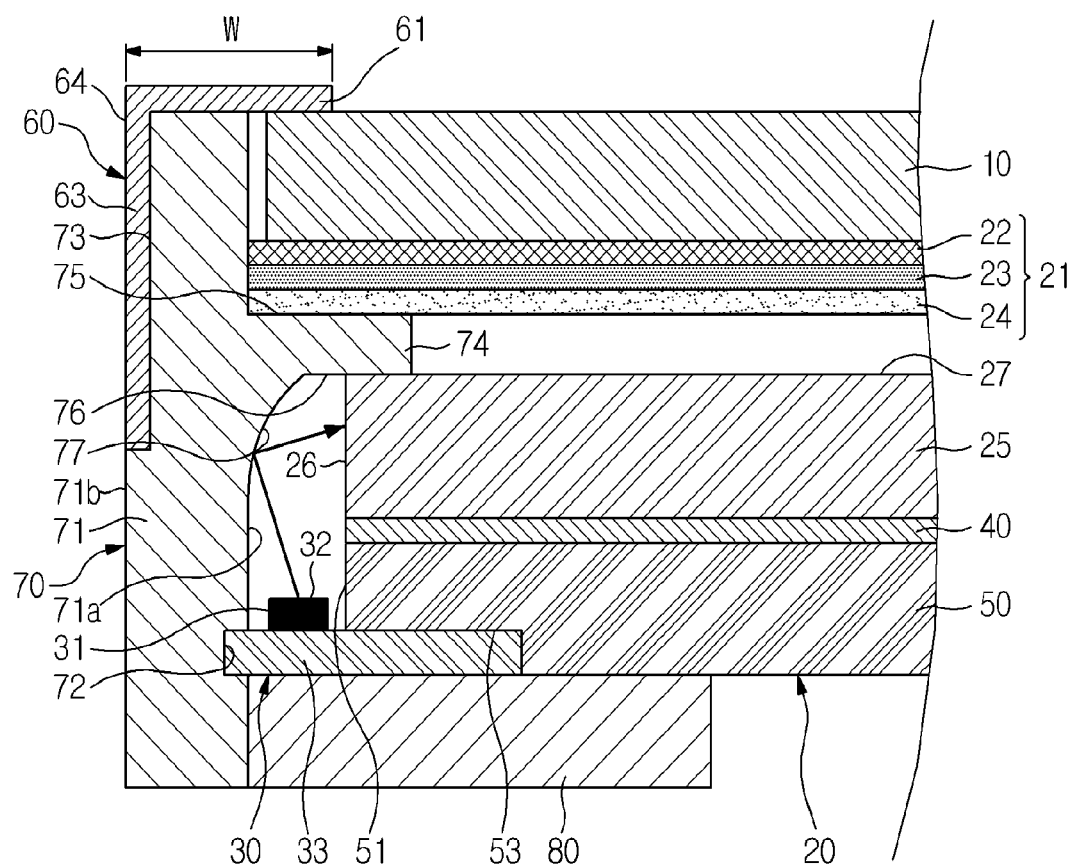
FIG. 2 is a sectional view illustrating an assembly structure of the liquid crystal display device, according to one exemplary embodiment.

FIG. 2 is a sectional view illustrating the assembly structure of a liquid crystal display device, according to one exemplary embodiment.

Referring to FIG. 2, the side frame 70 is provided with the side wall 71 to surround the outside of the liquid crystal display panel 10, the backlight unit 20 and the bottom chassis 50, and constitutes the side periphery of the liquid crystal display device.

A top side of the support rib 74 constitutes a mounting surface 75, on which the liquid crystal display panel 10 and the optical sheet 21 are mounted, and a bottom side of the support rib 74 constitutes a supporting surface 76 to support an upper edge of the light-guide portion 25.

Such a side frame 70 may be made of a resin material or a thermally conductive metal material. In this exemplary embodiment, the side frame 70 is made of a steel or aluminum material.

A light source unit 30 may be provided between an inner surface 71a of the side wall 71 and a side 51 of the bottom chassis 50.

The light source unit 30 may be arranged in a lateral lower part of the incident surface 26 of the light-guide portion 25 to prevent light from being directly emitted to the incident surface 26 of the light-guide portion 25.

For this purpose, one side of the printed circuit board 33 of the light source unit 30 is joined with the side frame 70, and another side of the PCB 33 is joined with the bottom chassis 50, and a plurality of light-emitting diodes 31 longitudinally spaced apart from one another are mounted on a top of the PCB 33 such that the light-emitting surface 32 directs light upward.

The side frame 70 may be provided at the inner surface 71a thereof with a mounting groove 72 shaped to enable one side of the printed circuit board 33 to be supported therein. The bottom chassis 50 is provided at the side 51 thereof with an accepting groove 53 shaped to enable the other side of the printed circuit board 33 to be accepted therein.

The one side of the printed circuit board 33 accepted in the accepting groove 53 may be fixed on the bottom chassis 50 through a mounting member 35 such as screw (see FIG. 1).

The side frame 70 may be joined to the bottom chassis 50 through a holder 80.

The holder 80 may be made of a highly thermally conductive metal material, steel or aluminum, which is the same material as the side frame 70 in this exemplary embodiment.

The holder 80 closely contacts the rear surface of the printed circuit board 33, with one side thereof connected with the side frame 70 through a connecting member 78 (see FIG. 1), and the other side thereof connected with the bottom chassis 50 through a connecting member 55 such as screw (see FIG. 1) in order to fasten the side frame 70 and the bottom chassis 50 with each other.

Such a holder 80 transfers heat generated from the light source unit 30 to the outside of the display device.

The liquid crystal display panel 10 mounted on the support rib 74 of the side frame 70 may be supported by the top chassis 60.

The top chassis 60 may include a bezel portion 61 to surround an upper-facing edge of the liquid crystal display panel 10 and a side portion 63 to surround a part of the side wall 71 of the side frame 70.

The side portion 63 of the side frame 70 is mounted on a recessed surface 73 through the connecting member 65 such as a screw (see FIG. 1); and the side portion 63 is formed from an outer surface 71b.

An outer surface 64 of the side portion 63 mounted on the recessed surface 73 may be substantially flush with the outer surface 71b of the side wall 71. This aims to reduce the width W of the bezel portion 61.

That is, where the side portion 63 covers the outer surface 71b of the side frame 70, the width W of the bezel portion 61 increases by a level corresponding to the thickness of the side portion 63. On the other hand, where the side portion 63 is mounted on the recessed surface 73, the width W of the bezel portion 61 decreases by a level corresponding to the thickness of the light source unit 30, independent of the arrangement of the light source unit 30.

The side frame 70 may be provided on the inner surface 71a thereof with a reflective surface 77.

The reflective surface 77 faces the light-emitting surface 32 of the light-emitting diodes 31 to horizontally refract light so that light directed from the light-emitting surface 32 upward is irradiated to the incident surface 26 of the light-guide portion 25.

The reflective surface 77 may have a curved cross-section having a predetermined curvature or an inclined cross-section.

Such a reflective surface 77 may be integrated with the inner surface 71a of the side frame 70 when the side frame 70 is made of a metal such as steel or aluminum.

On the other hand, when the side frame 70 is made of a resin material, the reflective surface 77 may be coated with a metal sheet having a high reflectance such as silver or aluminum.

Based on this configuration, a sufficient light mixing length can be created between the light source unit 30 and the incident surface 26 of the light-guide portion 25.

The light mixing length means a length of passage of light required for shielding a hot-spot generated when a spot light source emitted from the light-emitting diodes 31 is incident on the incident surface 26 of the light-guide portion 25.

That is, light irradiated from the light-emitting surface 32 of the light-emitting diodes 31 upward is reflected from the reflective surface 77 and then irradiated to the incident surface 26 of the light-guide portion 25, thus creating a sufficient light mixing length from light emitting from the light-emitting diodes 31 to the light-guide portion 25.

This configuration enables the light mixing length required between the light-emitting diodes 31 and the light-guide portion 25 to be created in a vertical orientation, thus reducing the width of the light mixing length and in turn reducing the width (W) of the bezel portion 61 required to cover the light mixing length.

As a result, the liquid crystal display device looks wider than an actual screen size due to decrease in width (W) of the bezel portion 61, thus improving aesthetic effects.

In addition, the liquid crystal display device is provided with the support rib 74 to mount the liquid crystal display panel 10 on the side frame 70 that constitutes the side periphery of the liquid crystal display device, thus eliminating the necessity of any separate middle mold to support the liquid crystal display panel 10, and additionally enabling reduction of raw material costs and simplification of an assembly process.

Figure 3:
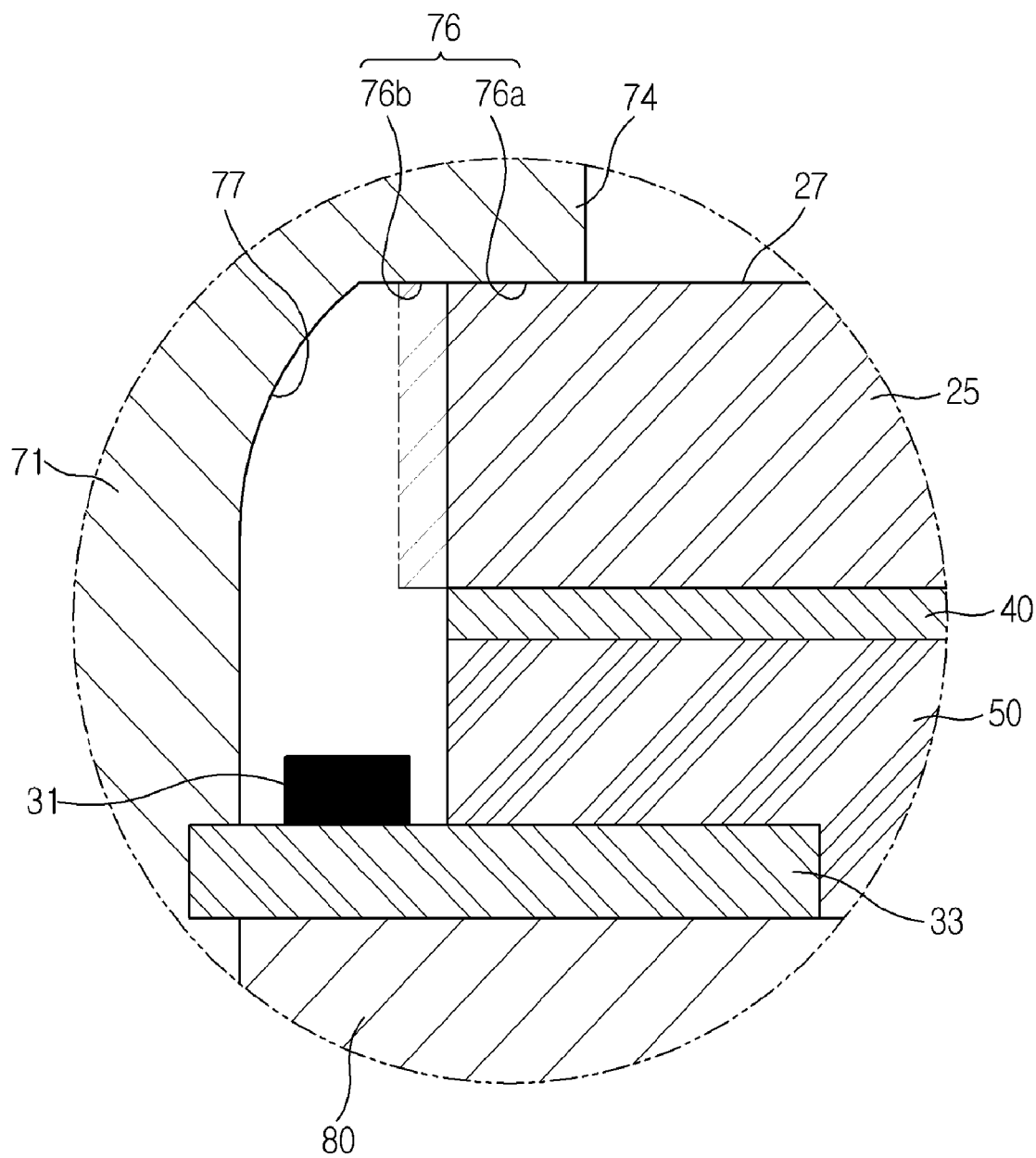
FIG. 3 is an enlarged sectional view illustrating a part of the liquid crystal display device, according to one exemplary embodiment.

FIG. 3 is an enlarged schematic view illustrating a supporting surface according to one exemplary embodiment. As shown in FIG. 3, the supporting surface 76 is parallel to the light-emitting surface 27 such that the supporting surface 76 closely contacts the light-emitting surface 27 of the light-guide portion 25.

Such a supporting surface 76 may include a first supporting surface 76a closely contacting an edge of the light-emitting surface 27 of the light-guide portion 25, and a second supporting surface 76b to compensate a length (imaginary line) to which the light-guide portion 25 is lengthened by thermal deformation.

The second supporting surface 76b is formed to have a flat surface flush with the first supporting surface 76a, and the reflective surface 77 is provided to be inclined downward at the end of the second supporting surface 76b.

Based on this configuration, although the light-guide portion 25 is expanded by heat, the gap between the light-emitting surface 27 of the light-guide portion 25 and the supporting surface 76 of the support rib 74 is not formed.

That is, where the reflective surface 77 is inclined downward at the end of the first supporting surface 76a, when the light-guide portion 25 thermally expands, the light-guide portion 25 pushes the side frame 70, and the gap between the supporting surface 76 and the light-guide portion 25 may be thus formed. On the other hand, in this exemplary embodiment, although the light-guide portion 25 is thermally expanded by the second supporting surface 76b, it does not interfere with neighboring structures, thus preventing formation of gap.

Accordingly, with no gap, light cannot escape through a gap formed between the support rib 74 and the light-guide portion 25, and therefore formation of bright lines on the liquid crystal display device 10 is prevented, which improves the reliability of the liquid crystal display device 10.

Although a few exemplary embodiments have been shown and described, it would be appreciated by those skilled in the art that changes may be made in these exemplary embodiments without departing from the principles and spirit of the invention, the scope of which is defined in the claims and their equivalents.

What is claimed is:
1. A liquid crystal display device comprising:
a liquid crystal display panel;

a top chassis arranged on a front surface of the liquid crystal display panel;

a bottom chassis disposed behind a rear surface of the liquid crystal display panel;

at least one optical sheet arranged between the liquid crystal display panel and the bottom chassis;

a light-guide portion arranged between the bottom chassis and the optical sheet;

a reflective portion arranged between the light-guide portion and the bottom chassis;

a side frame provided with a side wall to surround an outside of the light-guide portion, an outside of the reflective portion and an outside of the bottom chassis, the side frame comprising a support rib extending from the side wall to mount the liquid crystal display panel and the optical sheet;

a printed circuit board arranged between the side frame and the bottom chassis, the printed circuit board provided with a plurality of light-emitting diodes;

a reflective surface provided on an inner surface of the side frame to direct light irradiated from the light-emitting diodes to a side of the light-guide portion; and a holder to support one surface of the printed circuit board and connect the side frame with the bottom chassis, wherein the light-guide portion comprises a light-emitting surface facing the liquid crystal display panel, and light emitted from the plurality of light-emitting diodes enters an incident surface of the light-guide portion that is perpendicular to the light-emitting surface, and wherein the plurality of light emitting diodes are disposed between the reflective surface of the side frame and the incident surface of the light-guide portion in a direction perpendicular to a thickness direction of the light-guide portion.

2. The liquid crystal display device according to claim 1, wherein the holder is made of a thermally conductive material.

3. The liquid crystal display device according to claim 1, wherein the side frame is made of a metal material.

4. The liquid crystal display device according to claim 3, wherein the reflective surface is curved with a predetermined curvature.

5. The liquid crystal display device according to claim 1, wherein the side frame is made of a resin material.

6. The liquid crystal display device according to claim 1, wherein one side of the printed circuit board is mounted in a mounting groove formed on an inner surface of the side frame.

7. The liquid crystal display device according to claim 1, wherein the top chassis is provided with a bezel portion to support an edge of the liquid crystal display panel, and wherein the top chassis is provided with a side portion extending from an end of the bezel portion, wherein the side wall of the side frame is provided with a recessed surface to enable the side portion to be mounted therein.

8. The liquid crystal display device according to claim 1, wherein the support rib is provided with a mounting surface at a top side thereof to enable the liquid crystal display panel and optical sheet to be mounted, and wherein the support rib is provided with a supporting surface at a bottom side thereof to support a top of the light-guide portion.

9. The liquid crystal display device according to claim 8, wherein the supporting surface comprises a first supporting surface closely contacting the top of the light-guide portion and a second supporting surface extending from the first supporting surface and thus not closely contacting the top of the light-guide portion to compensate for a length of the light-guide portion that varies by thermal deformation.

10. The liquid crystal display device according to claim 9, wherein the reflective surface is inclined downward from an end of the second supporting surface.

11. The liquid crystal display device according to claim 1, wherein the reflective surface is spaced away from the incident surface and faces the incident surface.

12. The liquid crystal display device according to claim 11, wherein the light-emitting diodes are mounted on the printed circuit board such that the light emitting diodes emit light through a light emitting surface in an upward direction, and wherein the light-emitting surface is positioned below the reflective portion.

13. The liquid crystal display device according to claim 1, wherein the bottom chassis is made of a thermally conductive material and emits heat generated by the printed circuit board.

14. A liquid crystal display device comprising:

a liquid crystal display panel;

a light-guide portion comprising a light-emitting surface facing the liquid crystal display panel, wherein the light-guide portion supplies light to the liquid crystal display panel and receives light at an incident surface of the light-guide portion that is perpendicular to the light-emitting surface; and a printed circuit board disposed at a side of the light-guide portion, the printed circuit board provided with a plurality of light-emitting diodes;

a side frame provided with a side wall to constitute a side periphery of the liquid crystal display device; and a support rib extending from the side wall to enable the liquid crystal display panel to be mounted therein, wherein a reflective surface is provided at an inner surface of the side frame facing the incident surface to refract light emitted upward from a light-emitting surface of the light-emitting diodes toward the incident surface, and wherein the plurality of light emitting diodes are disposed between the reflective surface of the side frame and the incident surface of the light-guide portion in a direction perpendicular to a thickness direction of the light--guide portion.

15. The liquid crystal display device according to claim 14, wherein the support rib is provided with a mounting surface at a top side thereof to enable the liquid crystal display panel and optical sheet to be mounted thereon, and wherein the support rib is provided with a supporting surface at a bottom side thereof which is parallel to the light-emitting surface of the light-guide portion to enable the support rib and the light-emitting surface of the lightguide portion to closely contact each other.

16. The liquid crystal display device according to claim 15, wherein the supporting surface comprises a first supporting surface closely contacting the light-emitting surface of the light-emitting diodes and a second supporting surface to compensate for a length of the light-guide portion that varies by thermal deformation.

17. The liquid crystal display device according to claim 14, further comprising:

a reflective portion arranged under the light-guide portion; and a bottom chassis arranged under the reflective portion, wherein the plurality of light-emitting diodes are arranged between the inner surface of the side frame and a side of the bottom chassis.

18. The liquid crystal display device according to claim 17, wherein the inner surface of the side frame is provided with a mounting groove to enable one side of the printed circuit board to be mounted therein, and wherein the bottom chassis is provided with an accepting groove at an edge thereof to accept another side of the printed circuit board.

19. The liquid crystal display device according to claim 18, further comprising a holder closely contacting a bottom surface of the printed circuit board and connecting the side frame with the bottom chassis.

20. The liquid crystal display device according to claim 19, wherein the holder is made of a thermally conductive metal material.

21. The liquid crystal display device according to claim 17, further comprising:
   a top chassis provided with a bezel portion to support an edge of the liquid crystal display panel, and wherein the top chassis is provided with a side portion connected with the side wall of the side frame,
   wherein the side wall of the side frame is provided with a recessed surface to enable the side portion to be mounted thereon.

22. The liquid crystal display device according to claim 17, wherein an outer surface of the side portion mounted on the recessed surface is flush with an outer surface of the side wall.

23. The liquid crystal display device according to claim 14, wherein the side frame is made of a steel or aluminum material, and wherein the reflective surface is integrated with the side frame.

24. The liquid crystal display device according to claim 14, wherein the side frame is made of a resin material, and wherein the reflective surface is coated with a metal sheet with a high reflectance.

25. The liquid crystal display device according to claim 17, wherein the light-emitting diodes are mounted on the printed circuit board such that the light emitting diodes emit light through a light emitting surface in an upward direction, and
   wherein the light-emitting surface is positioned below the light-guide portion.

26. A liquid crystal display device comprising:
   a liquid crystal display panel;
   a light guide portion disposed below the liquid crystal display panel and reflecting light to the liquid crystal display panel;
   a printed circuit board disposed below the light guide portion and provided with a plurality of light-emitting diodes on a periphery thereof;
   a side frame surrounding side surfaces of each of the liquid crystal display panel, light guide portion and printed circuit board, the side frame comprising an angled inner surface reflecting light from the plurality of light-emitting diodes to the side surfaces of the light guide portion;
   a top chassis connected with the side frame and supporting the liquid crystal display panel; and
   a bottom chassis connected with the side frame and supporting the printer circuit board.
   wherein the reflected light from the angled inner surface enters into the light guide portion through the side surfaces of the light-guide portion,
   wherein the side surfaces of the light guided portion are perpendicular from a light emitting surface of the light guide portion which faces the liquid crystal display panel, and
   wherein the plurality of light emitting diodes are disposed between the angled inner surface of the side frame and the side surfaces of the light-guide portion in a direction perpendicular to a thickness direction the light-guide portion.

27. The liquid crystal display device of claim 26, wherein the angled inner surface of the side frame is a curved surface.

28. The liquid crystal display device of claim 26, wherein the angled inner surface is coated with a reflective material.

29. The liquid crystal display device according to claim 1, wherein the reflective surface comprises a concave curvature.

30. The liquid crystal display device according to claim 14, wherein light emitted from the plurality of light-emitting diodes enters into the light-guide portion through the incident surface.

31. The liquid crystal display device according to claim 14, wherein the reflective surface comprises a concave curvature.

32. The liquid crystal display device of claim 26, wherein the angled inner surface comprises a concave surface.

\* \* \* \* \*